United States Patent [19]
Young et al.

[11] Patent Number: 5,859,071
[45] Date of Patent: *Jan. 12, 1999

[54] RECYCLING OF CARPET SCRAP

[75] Inventors: Dennis C. Young, Mechanicsburg; Stanley J. Chlystek, Mountville, both of Pa.; Robert Malloy, Londonderry, N.H.; Ivan Rios, Washington, D.C.

[73] Assignee: Lear Corporation, Southfield, Mich.

[*] Notice: The term of this patent shall not extend beyond the expiration date of Pat. No. 5,719,198.

[21] Appl. No.: 998,953

[22] Filed: Dec. 29, 1997

Related U.S. Application Data

[63] Continuation of Ser. No. 632,262, Apr. 15, 1996, Pat. No. 5,719,198.

[51] Int. Cl.$^6$ ............................................... C08J 11/04
[52] U.S. Cl. ..................... 521/40.5; 241/23; 241/24.18; 241/25; 525/71
[58] Field of Search ............................. 521/40.5; 241/23, 241/24.18, 25; 525/71

[56] References Cited

U.S. PATENT DOCUMENTS

| | | | |
|---|---|---|---|
| Re. 31,826 | 2/1985 | Machell | 428/92 |
| 3,352,733 | 11/1967 | Kruce | 156/94 |
| 3,390,035 | 6/1968 | Sands | 156/72 |
| 3,537,946 | 11/1970 | Truax et al. | 161/66 |
| 3,551,231 | 12/1970 | Smedberg | 156/72 |
| 3,562,373 | 2/1971 | Logrippo | 264/118 |
| 3,583,936 | 6/1971 | Stahl | 260/28.5 |
| 3,620,860 | 11/1971 | Eckardt et al. | 156/247 |
| 3,676,280 | 7/1972 | Sands | 161/67 |
| 3,684,600 | 8/1972 | Smedberg | 156/93 |
| 3,725,538 | 4/1973 | Brewer | 423/449 |
| 3,857,799 | 12/1974 | Ooba et al. | 260/2.3 |
| 3,923,653 | 12/1975 | Lavins, Jr. | 210/71 |
| 3,928,051 | 12/1975 | Brownlow et al. | 106/53 |
| 3,940,525 | 2/1976 | Ballard | 428/96 |
| 3,941,066 | 3/1976 | Itoh et al. | 110/18 R |
| 3,956,414 | 5/1976 | Oshima | 260/683 R |
| 3,982,051 | 9/1976 | Taft et al. | 427/207 |
| 4,020,020 | 4/1977 | Appleyard et al. | 260/2.3 |
| 4,028,159 | 6/1977 | Norris | 156/94 |
| 4,082,874 | 4/1978 | Traylor, Jr. | 428/54 |
| 4,105,593 | 8/1978 | Stavrinou | 260/2.3 |
| 4,158,646 | 6/1979 | Benkowski et al. | 260/2.3 |
| 4,199,109 | 4/1980 | Watanabe | 241/14 |
| 4,234,366 | 11/1980 | Brewer et al. | 156/79 |
| 4,319,938 | 3/1982 | Vives | 156/49 |
| 4,522,857 | 6/1985 | Higgins | 428/95 |
| 4,535,940 | 8/1985 | Geng | 241/3 |
| 4,546,128 | 10/1985 | Nakajima | 523/222 |
| 4,576,665 | 3/1986 | Machell | 156/72 |
| 4,599,131 | 7/1986 | Matuszak | 156/584 |
| 4,662,569 | 5/1987 | Acker | 241/62 |
| 4,663,370 | 5/1987 | Marvel, Sr. et al. | 523/221 |
| 4,715,920 | 12/1987 | Ruppman et al. | 156/344 |
| 4,775,697 | 10/1988 | Schoenhard | 521/48 |
| 4,808,482 | 2/1989 | Benge et al. | 428/411.1 |
| 4,824,498 | 4/1989 | Goodwin et al. | 156/71 |
| 4,844,765 | 7/1989 | Reith | 156/306.6 |
| 4,875,954 | 10/1989 | Griffiths | 156/64 |
| 4,956,033 | 9/1990 | Martin et al. | 156/94 |
| 5,061,735 | 10/1991 | Zielinski | 521/46.5 |
| 5,076,870 | 12/1991 | Sanborn | 156/73.1 |
| 5,080,291 | 1/1992 | Bloom | 241/19 |
| 5,145,617 | 9/1992 | Hermanson et al. | 264/37 |
| 5,169,870 | 12/1992 | Corbin et al. | 521/49.8 |
| 5,169,876 | 12/1992 | Heitmann et al. | 521/155 |
| 5,194,109 | 3/1993 | Yamada | 156/94 |
| 5,221,395 | 6/1993 | Luetkens, Jr. et al. | 156/244.11 |
| 5,230,473 | 7/1993 | Hagguist et al. | 241/3 |
| 5,233,021 | 8/1993 | Sikorski | 528/491 |
| 5,240,530 | 8/1993 | Fink | 156/94 |
| 5,244,971 | 9/1993 | Dekoninck | 525/64 |
| 5,244,973 | 9/1993 | Sakazume et al. | 525/66 |
| 5,294,384 | 3/1994 | David et al. | 264/37 |
| 5,375,778 | 12/1994 | Lundquist | 241/24 |
| 5,518,188 | 5/1996 | Sharer | 241/14 |
| 5,535,945 | 7/1996 | Sferrazza et al. | 241/24.12 |

FOREIGN PATENT DOCUMENTS

| | | |
|---|---|---|
| 24 25 751 | 12/1975 | Germany . |
| 38 16 894 | 11/1989 | Germany . |
| 54-117579 | 9/1979 | Japan . |
| 58-119821 | 7/1983 | Japan . |
| 60-185823 | 9/1985 | Japan . |
| 60-206868 | 10/1985 | Japan . |
| 60-219016 | 11/1985 | Japan . |
| 63-57355 | 3/1988 | Japan . |
| 971958 | 10/1964 | United Kingdom . |

OTHER PUBLICATIONS

Watzl, A., "Recycling of Textile Waste into Nonwovens Products," Translation of *Melliand Textilberichte*, 73, p. 397, May, 1992.

Malloy, R., et al., "Reclamation of Automotive Carpet Scrap," *AIChe Spring National Meeting*, Mar. 29, 1992.

Ryburn Foam, Ltd., "Method of Reclamation of Carpet, Slipper and Other Mixed Textile Waste," *RD 19524*, Jul. 10, 1980.

Sadrmohaghegh, C., et al., "Recycling of Mixed Plastics," *Polym. Plast. Technol. Eng.*, 24(2&3), pp. 149–185, 1985.

Soviet Technology Alert, "Carpets From Plastic Waste," *Elsevier Advanced Technology Publications*, vol. 1, No. 3, Mar., 1988.

United Recycling, Inc., "Carpet Recycling Is Here!," *Midwest Retailer*, vol. 21, No. 7, p. 1, Jul., 1992.

Wagner, R.H., "A New Technology for Recycling Carpet Waste," Translated from *Chemiefasern/Textilindustrie*, vol. 28/80, pp. 644–648, Jul., 1978.

*Primary Examiner*—Bernard Lipman
*Assistant Examiner*—N. Sarofim
*Attorney, Agent, or Firm*—Wood, Herron & Evans, L.L.P.

[57] ABSTRACT

A polymeric blend formed from recycled carpet scrap and selected compatibilizing agents and/or a poly(ethylene-co-omylacetate) and the products produced from such blend.

8 Claims, No Drawings

RECYCLING OF CARPET SCRAP

RELATED APPLICATIONS

This application is a Continuing Application of U.S. application Ser. No. 08/632,262, filed Apr. 15, 1996, now U.S. Pat. No. 5,719,198, which is based on abandoned U.S. application Ser. No. 08/284,169, filed Aug. 2, 1994, which in turn is a divisional of abandoned U.S. application Ser. No. 08/114,013, filed Aug. 30, 1993, and which are all incorporated herein in their entireties by reference.

TECHNICAL FIELD OF THE INVENTION

The invention relates to a secondary recycling method of preparing a polymeric blend formed from carpet scrap through the use of selected compatibilizing agents and the products produced therefrom. The carpets from which the scrap is generated have a backing comprising polyolefins or olefin copolymer resins alone or in combination with fillers. More particularly, the invention relates to the method of forming a useful product having desired properties from carpet scrap comprising a polyamide, a polyester, polyolefins, etc. which are normally incompatible in the molten and solid states, through the use of one or more compatibilizing polymers or copolymer resins.

DESCRIPTION OF THE PRIOR ART

The use of plastics throughout the world in a myriad of applications has increased exponentially since the end of World War II. The plastics industry has experienced phenomenal growth during the last decade. In 1976, plastics became the most widely used material in the United States, surpassing even steel. Plastics are now used in every segment of American business and are found in all aspects of daily life. Accordingly, the problem now exists of what to do with the waste embodied in plastic products after their service life is exhausted. The heightened awareness of the environment has raised concerns about waste and what to do with it once it is generated. The total volume of plastics used in the automotive industry alone will reach billions of pounds over the next decade. Cars manufactured in the United States recently had on average almost 300 pounds of plastics in each unit.

The significant increase in plastics production and product generation has effected a similar significant increase in plastics disposal. Estimated at more than 7% by weight, but possibly twice that by volume, the amount of plastics in the nation's solid waste stream has more than doubled in the last 15 years; a greater percentage rise is expected as more plastic packaging and durable plastic components of automobiles and appliances come to the end of their service life.

The present invention focuses on recycling carpet scraps consisting of, among other things, thermoplastic material, or carpet scraps mainly composed of thermoplastic materials that are used in carpet applications. It is estimated that up to 3 billion pounds of carpet are discarded every year in the United States alone.

Automobile carpet in most instances comes from fiber-forming polymers, predominately nylon 6 and nylon 6,6, polypropylene, polyethylene, polyester, and acrylics. Automotive carpet scrap waste comes from two sources: the cars' fitting process and post consumer waste.

In the course of manufacture, a car is fitted with interior carpets. During the fitting process, a quantity of carpet remnant is generated as the carpet is formed and cut into various irregular shapes. As a result, millions of pounds of carpet waste are generated every year as part of the automobile manufacturing process. Nearly all of this carpet waste ends up in the waste stream as manufacturing waste since the composite waste plastic is difficult to reuse in the primary manufacturing process, due to problems with separation, etc.

A second source of carpet waste is post consumer waste. When an automobile is disposed of after its years of useful life, the carpet installed therein ends up in the waste stream as "post consumer waste."

Besides the carpet waste generated from automobile manufacturing, carpet waste is also generated during residential and nonresidential building construction as well as during renovation. The volume of carpet waste generated each year is expected to continue to increase worldwide.

It is known that the total amount of manufacturing waste can be as much as 12% of total production in a fully-integrated carpet manufacturing plant, with the waste comprising approximately 5–7% edge trimmings and 3–5% offcut.

Due to its low bulk density, carpet waste can be voluminous. Therefore, recycling of these carpets and rugs would have a significant impact on efforts to effectively reduce plastic components in municipal waste streams. Carpet scraps of the sort noted above, can prove to be a valuable resource if the plastic generated from recycling can be used for other useful applications rather than being discarded into municipal waste streams.

There are four categories of plastic recycling technologies that have emerged over the past decades. These are:

1. Primary recycling: The conversion of scrap plastics by standard processing methods into products having performance characteristics equivalent to the original products made of virgin plastics.

2. Secondary recycling: the conversion of scrap or waste plastics by one or a combination of process operations into products having less demanding performance requirements than the original material and product.

3. Tertiary recycling: the process technologies of producing chemicals and fuels from scrap or waste plastics.

4. Quaternary recycling: the process technologies of recovering energy from scrap or waste plastics by incineration.

Carpet waste, by its nature as noted above, contains more than one polymeric material. Primary recycling of the commingled material does not appear to be generally practical due to separation and handling problems. The emphasis in the automotive industry is to develop ways to recycle used nylon carpet for direct automotive applications if it can be isolated into a substantially pure product. The recycling can be done chemically or physically. Chemical recycling implies tertiary recycling. This can be done with nylon but might be more difficult using other components. The nylon can also be "physically" recycled because it is a thermoplastic material. Chemical reactions, if any, would be due to reaction with compatibilizers.

The interest in secondary recycling of carpet or other commingled waste continues to increase due to increasing costs of storage and/or landfill space, more stringent regulations for disposal, incineration, among other things.

Plastics recycling in the United States up to the present time has focused mainly on plastics packaging and primarily on plastic bottles and containers. Technology for the reclamation of polyethylene terephthalate (PET) bottles has been developed due to their high volume in the post consumer waste stream; similar technology also exists for reclaiming other plastics bottles, film and molded fabricated parts. PET is currently the major recyclable plastic material, followed by high-density polyethylene (HDPE), polypropylene (PP), and polyvinyl chloride (PVC). Other polymers such as styrenics, acrylics, polycarbonates, polyurethanes are also reclaimed and recycled. Other mixed plastic waste recycling technologies have been developed for commingled plastics when separation becomes impractical.

The different alternatives for plastics disposal or recycling are: (1) land-fill dump sites, (2) incinerating, (3) pyrolysis, (4) hydrolysis, (5) composting, (6) bio-degradation, and (7) recycling. The present invention relates to recycling.

The recycling alternative reduces the oil and natural gas demand as feedstock and as energy source for the polymerization of the plastic. Additionally, recycling the plastic materials eliminates any disposal problem.

As mentioned above, plastic products, such as carpet, usually contain more than one polymeric material and thus primary recycling of the commingled material is not generally practical due to separation and handling problems. The interest in secondary recycling of commingled waste continues to increase due to the increased costs of storage and/or landfill space. But often when two or more incompatible polymers are mixed, secondary recycling has produced poor mechanical properties of the final material and product developed from the mixture. Among the tertiary and quaternary recycling technologies, incinerating is losing in favor as a treatment method because of technical, economical, and environmental reasons. Specific difficulties cited include the increase in capital and operating costs of this treatment (at least partially due to environmental controls being demanded) by the public. In considering the question of the disposition of any polymer in carpet scrap as to whether it is more efficient to recycle than to burn, current thinking among conservationists is that if it takes more than twice as much energy (e.g., BTU per pound) to make a plastic than is achieved by burning the plastic, the plastic should be recycled as the recycling approach is more efficient. The energy ratio (energy to make the plastic/energy from burning the plastic) for nylon being about 7:1 clearly dictates that nylon should be recycled and not burned.

Secondary recycling as used in the present invention involves using wastes for production of articles having different demanding specifications. There are more processes of industrial importance and many available applications. Generally materials originating from recycled wastes have found application in producing shaped articles used in packing and transportation, civil engineering, agriculture, fishery and many other fields. These applications are efficient for the consumer since the material can usually be obtained for a fraction of the cost of primary material.

Several types of manufacturing processes have been developed specifically for processing commingled plastics. These processes may be roughly categorized into either an extrusion process or a compression molding process.

Each of these processes is capable of producing products from a variety of macroscopically non-homogeneous mixtures of waste plastics. Because of the heterogeneous nature of these mixtures, commingled processes are generally limited to producing products of large cross-sections, where small internal imperfections may be of little consequence for the mechanical properties.

SUMMARY OF THE INVENTION

There has been increasing interest in the recycling of the commingled plastics waste of automobiles. The different engineering plastics used in various parts of an automobile include polycarbonate, nylons, polyethylene terephthalate, acrylonitrile-butadiene-styrene, unsaturated polyesters as sheet-molding compound, and polyurethane. Also a large amount of polypropylene is used, but some do not consider it an "engineering plastic" due to its relatively low cost per pound as compared with, for example, polycarbonate. At this particular time, there is no effective way to recover the engineering plastics or any other polymeric materials when the automobile is disposed of after its useful life.

The present invention relates to recycling plastic containing carpet products. For the purpose of this invention, carpet can be divided into two major categories: woven and non-woven carpets.

Non-woven bonded fabrics are sometimes also called "composite textiles." They are seen as textile fabric consisting of fiber mats held together because of their inherent bonding properties or as a result of a mechanical process involving the use of a chemical bonding agent. Their properties depend on what they are going to be used for and are expressed in the form of physical and chemical characteristics.

Tufted carpets are composite structures in which the yarn that forms the pile (the surface of the carpet) typically nylon 6 or nylon 6,6, polypropylene, polyester as set forth in further detail below, is needled through a base or backing fabric such as a spun bonded polyester. The base of each tuft extends through this backing fabric and is visible on the bottom surface of the composite structure. Tufted carpets are generally of two types, nap and shag.

In nap carpets, yarn loops are formed by needling or punching a continuous yarn just through the base fabric, thus forming the base of the carpet, while the tops of the loops are generally ¼ to ¾ inch long, thus forming the wearing surface of the carpet.

Shag carpets have the same base as the nap carpet but the tops of the loops have been split or the tips of the loops have been cut off. The surface of the shag carpet is thus formed by the open ends of the numerous U-shaped pieces of yarn, the base of the U being embedded in the base fabric.

The loops of yarn are needled through and embedded in the backing (the combination of which is the raw tufted carpet), thus forming the tufted base, which must be secured to the base fabric to prevent the loops from being pulled out of the base fabric. The tufted bases are generally secured by applying a coating compound known as a precoat to the back of the raw tufted carpet to bond the tufted yarns to the base fabric. This is generally polyethylene or poly(ethylene-co-vinyl acetate). A secondary backing material known as a mass coat usually is also applied to the back of the raw tufted carpet and bonded to it with the same pre-coat adhesive that secures the yarn to the base fabric.

The mass coat can be heavily filled or unfilled, polyethylene or ethylene-vinyl acetate copolymer. The application of the secondary backing material further secures the loops of yarn since they are then bonded by the adhesive to the backing material as sell as the base fabric.

The base fabric or primary backing may be of any type known in the art and may be non-woven polymer fabric. Likewise, the secondary backing material may also be nonwoven polymer fabrics. The aforementioned backings are formed from materials such as needle-punched, woven or non-woven polypropylene and non-woven polyester webs and fabrics and blends thereof.

The ethylene-vinyl acetate copolymer backing material consists of a low melting point thermoplastic material, sometimes filled with inorganic particulate fillers such as calcium carbonate or barium sulfate. The fiber portions of the carpet are produced from materials such as polypropylene, nylon 6, or nylon 6,6, and polyethylene terephthalate (PET). Mixed recycling is a possible approach for this composite product, however, there can be problems with compatibility of the various materials that make up the carpet. Although a considerable effort has been undertaken regarding the improvement of compatibility of immiscible polymer blends related to the recycling of mixed plastic waste, very few studies have been reported on the recycling of carpet scrap.

The yarn used in forming the pile of a tufted carpet can be made of any type of fiber known in the art to be useful for tufted carpets, e.g., nylon, acrylics, wool, cotton, and the like. Nylon 6 and nylon 6,6 are the most commonly used fiber material for the carpet face itself. While blends of nylons and polypropylene are generally not directly compatible, it has been determined that compatibilizing additives such as carboxyl containing ethylene copolymers can improve the mixed recycling of polypropylene blends.

This is particularly pertinent in the nylon/polypropylene carpet recycling since copolymer materials such as ethylene/vinyl acetate (EVA) are commonly used in back-coating of the carpet composition. These back coatings are usually applied in the form of a latex or an extruded "hot melt." The carpet is then either heated to cure the latex, or allowed to cool to solidify the hot melt. It has been discovered that the recyclability of the carpet is improved if a compatibilizing additive, such as a ethylene-vinyl acetate copolymer, is used as a functional component by addition to the carpet formulation.

Automotive carpets differs slightly from other carpets. The principal difference is the amount of backcoat material used. The backcoat or mass coat in automotive carpets serves an additional purpose beyond securing tufts in place and consolidating the carpet's foundation. It serves as a sound insulation barrier in an automobile. The quiet ride effect is achieved, in part, using the carpet's backcoat. Increasing the mass between a noise source and the interior of the automobile is a typical way to obtain a "quiet ride." Thus the automotive carpet backcoats are generally thick and represent over 50% of the carpet's total weight. Inorganic fillers such as $CaCO_3$ and $BaSO_4$ are typically used to improve the sound insulating properties.

Of these two fillers, $BaSO_4$ has the superior sound insulating properties due to its higher density. There are definite trade-offs between sound insulation properties and increasing weight, which in turn reduces fuel efficiency. Cost is also an important factor. $CaCO_3$ is the cheaper filler of the two on a cost/mass basis.

Prior art covering automotive carpet backing discloses an assortment of materials, additives, and respective concentration ranges that can be used in the backing formulations.

Carpet scraps produced from the car fitting process are predominately trimmings. Due to its low bulk density, the volume of carpet scraps generated is remarkably large. Of the size reduction operations, namely crushing, cutting, grinding, shearing, granulating, pelletizing, dicing and pulverizing, the granulating operation is most commonly used in the plastics industry. The suitability of the granulate to be refed into an extruder or other processes depends mainly on the flowability of the granulate which is affected by its bulk density or particle size. The granulation condition and the granulator configuration are important factors in the present invention which affect the granulate quality, the specific energy, and the throughput rate.

The granulator typically used herein employs both shear cutting and high speed impact shattering principles to reduce the size of the material as is found in the prior art. While ductile materials are reduced in size basically by the shear cutting action, materials that are relatively brittle are comminuted by the high speed impact shattering.

In any granulation of plastics scrap, pursuant to the present invention, the particle size of the granulate is very important since it influences the quality of the melt during the next melt processing operation. Fine particulate matter should be avoided since it melts prematurely and can cause low output and surging in the extrusion or injection molding. Chips that are too large should be avoided because they can cause feeding problems in the hopper and the feed throat.

For light scrap materials commonly encountered in the product areas of film, fibers, and carpet, the bulk density of the material after size reduction is normally too low for direct recycling back into the process, except in low percentages. These materials must be reprocessed to a higher density feed form such as pellets before reuse. This can be accomplished by various types of equipment, but it always involves, first, the remelting of the scrap and then the forming of pellets or similar shapes. A reclaim extruder is ideally suited for this purpose. It usually possesses a "wider" feed throat or stuffer cylinder.

In employing the method of the present invention, better melt compounding is obtained using a twin-screw extruder. The twin-screw extruder is capable of melting, mixing, and pumping slurries or viscoelastic melts at high temperatures, pressures, viscosity, and changes in the three. Moreover, it has the ability to sequence the processing steps, have down-stream addition of monomers, polymers, or other additives via additional injection ports located anywhere between the feed hopper and the die entrance, and also devolatilize any impurities, unreacted monomer, or byproducts of the process. In addition, the processor has the opportunity of combining one or more down-stream processing operations, such as compounding and shaping, and reaction in the same machine.

Twin-screw extruders have modular screw and barrel designs, and assembly arrangements, permitting the extruder geometry to be optimized for specific formulations. These extruders are built with segmented screws and barrel elements that can be profiled for any application. The important functions of twin-screw extruders are as the segmented screw and barrels design, close temperature control over the entire screw length and over broad temperature ranges, optimum process scale-up for complete reaction by choosing the proper extruder length, precise control of reaction (for reactive processing) by narrow residence time distributions in the reaction zone, and the option of devolatilization at any section of the extruder.

In accordance with the present invention twin screw extruders are preferably used to blend the mix although a single screw extruder may be used effectively. High shear batch or similar mixers such as a Banbury mixer can also be used to compound the material.

The properties of the final product of the present invention depend heavily on the compatibility of the multi-components of the blend.

For thermodynamic reasons, most polymer pairs are not miscible on molecular level. Nevertheless the degree of compatibility of two polymers may vary to a high extent. The dispersed phase in uncompatibilized immiscible polymer blends often tends to coalesce during the post compounding processing steps. To stabilize and to improve the dispersion of the minor phase, interfacial agents are generally added. These substances are used to increase the miscibility of two polymers and often are called compatibilizers, compatibilizing agents or surfactants. Compatibilizing agents are generally low molecular weight block or graft copolymers with at least two distinct chemical functionalities. For example, one part of the molecule may show affinity towards polar materials while the other may be compatible with non-polar materials, forming links with both phases. The compatibilizers are believed to migrate preferentially towards the interface and reduce the interfacial tension between the components of the blend. The overall effect of compatibilization is a finer and more stable dispersion and compatibilizers can be added to the blend as a third component or can be formed in-situ. The in-situ formation of compatibilizers can be achieved by modifying one of the components so that it reacts with the functionality of the other component during the compounding process, forming a graft or a block copolymer. The proper use of compatibilizers leads to marked improvement of many properties of blends.

Thermodynamic compatibility can be expressed as follows:

$$\Delta G_{mix} = \Delta H_{mix} - T\Delta S_{mix}$$

Where $\Delta H_{mix}$ is the enthalpy of mixing, $\Delta S_{mix}$ is the entropy of mixing and T is the absolute temperature. For two polymers to be considered thermodynamically compatible or miscible, $\Delta G_{mix}$ must be negative.

Since two unlike polymer molecules have less attraction for each other they do for their own kind, the enthalpy of mixing, or $\Delta H_{mix}$ will be positive and thus unfavorable to compatibility. When small molecules such as solvents are mixed, the random mixture has much more entropy than the pure ingredients, so that $T \Delta S_{mix}$ overcomes the unfavorable $\Delta H_{mix}$, thereby making the change in free energy negative, which favors mixing. In mixing large polymer molecules, on the other hand, the atoms or groups of atoms are restricted by being tied into the polymer molecules, so that mixing is much less random, and the entropy gain is much lower; thus the $-T \Delta S_{mix}$ term is insufficient to overcome the unfavorable $\Delta H_{mix}$; $\Delta G_{mix}$ remains positive, and thus mixing is unfavorable, making the two polymers incompatible with each other. Thus one would expect that polymer blends would rarely, if ever, be compatible. Further mathematical treatment of above equation, particularly the $\Delta H_{mix}$ term, leads to solubility parameters. These parameters help to predict the compatibility of polymer pairs. For polymers to be considered thermodynamically miscible, the difference in values should not exceed 1 $[cal/cm^3]^{1/2}$. Few polymer pairs exhibit thermodynamic miscibility.

Polymers can be blended to form a wide variety of random or structured systems with desirable combination of properties but in practice, these theoretically expected properties are not achieved because of poor adhesion of the phase created. For this purpose one applies mostly block or graft copolymers with long segments or blocks. It has been shown that the blocks constituting these molecules at the interphase have to be miscible with phases A or B (the blocks or segments of interfacial agents are chemically identical or similar to A or B) to reduce the interfacial energy between the immiscible phases. They also ensure finer dispersion during mixing and provide a higher stability against separation.

Block or graft compatibilizers have to segregate into two phases in order to localize at the blend interface. The specific behaviors of the homopolymer phase depends on the interactions between two segments and on their molecular weights. The amount of compatibilizer required depends on many factors of which crystalline structure, conformation and molecular weight are the most important.

The carpet in the present invention comprises a multi-component product, which contains nylon 6; nylon 6,6; polypropylene; EVA; etc. The compatibility of these polymers is significantly important to the properties of recycled carpet-made parts. It is very difficult to obtain good dispersability in a mechanical blend of polymer such as, in the instant case, the combination of nylon 6, nylon 6,6 polyester, polypropylene, polyethylene and ethylene-vinyl acetate copolymer plus filler. However, it may be possible to obtain good solubility in the blend of these undissolved polymers by introducing a suitable compatibilizer that has good solubility with each polymer to be blended.

The composition of the present invention is a blend of polymers that can be formed into any of the commercial shaped articles that are made from thermoplastic polymers today.

The present invention covers a variety of blends the composition of which is dependent upon the composition of the scrap material used in the process.

The composition contains the following constituents in the ranges set forth below with the understanding that in one embodiment, the scrap from which the final blend is made, is generated from a carpet having nylon fibers; alternatively, the scrap used is generated from carpet having polypropylene or polyester fibers. The remaining constituents in each of the compositions cited must contain at least 5% ethylene-vinyl acetate copolymer and optionally comprises one or more of the other constituents listed.

The ethylene vinyl-acetate copolymer is present in the blend from two possible sources.

First, the ethylene-vinyl acetate copolymer may be present in the blend as a result of its presence in the mass coating or backing on the carpet scrap or from other sources. Its presence may vary from 0 to 36% by weight.

Secondly, the ethylene-vinyl acetate copolymer is present in the blend as a result of a separate addition to the blend prior to mixing. The amount of the ethylene-vinyl acetate resin which may optionally be added to the blends with the compatibilizing agents will range between about 1% and 30% by weight. It has been discovered that the ethylene-vinyl acetate copolymer enhances the properties of the final blend that is produced according to the method of the present invention.

The composition of the various scrap materials described above comprises: nylon 6 or nylon 6,6, 0–35%; polypropylene 0–55%; polyester 0–35%; polyethylene 0–18%; ethylene-vinyl acetate copolymer 0–36%; filler 0–60%.

A typical carpet scrap formulation used in the present invention comprises the following composition:

| Component | Composition | Amount |
|---|---|---|
| Face | nylon 6 or nylon 6, 6 | 10–24 oz/sq yd |
| Primary Backing | polypropylene or polyester | 3–4 oz/sq yd |
| Precoat | poly(ethylene-co-vinyl acetate) or low density polyethylene | 8–12 oz/sq yd |
| Back coat | Filled poly(ethylene-co-vinyl acetate) | 30–136 oz/sq yd |

The scrap material having a composition within the aforementioned ranges is granulated as described above and the composition particles are dried at 90° C., and melt compounded at 230° C., and pelletized. Parts are manufactured therefrom using injection molding or extrusion processes. It is possible to skip the twin screw melt compounding operation and make a product directly by extrusion molding since these processes also do some mixing. The properties of such compositions are set forth in Table 16, no. 5; Table 17, no. 20; Table 22, no. 90 hereinafter.

Poly(ethylene-co-vinyl acetate) (EVA) was found to be a useful resin additive when it had a melt flow rate of 0.8–19 g/10 min (ASTM D1238) and a vinyl acetate content of about 9% to about 36%. The EVA polymer resin was blended with the scrap at a concentration of between about 1% and 30%.

Examples of such compositions are disclosed at Table 18 nos. 45, 51, 63 hereinafter.

The compatibilizing agents added to the blend are also added in amounts of between about 1% and 30% by weight.

The EVA resin and compatibilizers alone or in combination are not added in excess of a total of about 30% by weight.

An example of such composition is set forth hereinafter in Table 19, no. 69.

The preferred formulations of the present invention comprise the scrap plus EVA plus compatibilizer as set forth hereinafter in Table 20 nos. 72–83 and Table 22, nos. 96–100, preferably no. 98.

Two other especially preferred compositions useful in the present invention are found in Table 22, nos. 94 and 95.

The following are examples of typical carpet scrap compositions that were modified in accordance with the present invention:

| A | |
|---|---|
| nylon | 12%–35% |
| polyester | 1%–3% |
| polypropylene | 1%–3% |
| polyethylene | 7%–18% |
| EVA | 15%–36% |
| filler | 34%–60% |

| B | |
|---|---|
| nylon | 12%–35% |
| polyester | 1%–3% |
| polypropylene | 1%–3% |
| polyethylene | 7%–18% |

| C | |
|---|---|
| nylon | 12%–35% |
| polypropylene | 1%–3% |
| polyethylene | 7%–18% |
| EVA | 15%–36% |
| filler | 34%–60% |

| D | |
|---|---|
| nylon | 12%–35% |
| polyester | 1%–3% |
| polyethylene | 7%–18% |
| EVA | 15%–36% |
| filler | 34%–60% |

| E | |
|---|---|
| nylon | 12%–35% |
| polyester | 1%–3% |
| polypropylene | 1%–3% |
| EVA | 15%–36% |
| filler | 34%–60% |

| F | |
|---|---|
| nylon | 35%–55% |
| polyester | 10%–15% |
| polyethylene | 40%–45% |

| G | |
|---|---|
| polyester | 33%–60% |
| polyethylene | 40%–67% |

| H | |
|---|---|
| polyester | 15%–44% |
| polypropylene | 33%–51% |
| filler | 24%–34% |

DESCRIPTION OF THE PREFERRED EMBODIMENT

Automotive carpet has been described above as a multi-component product. Each of the polymers forming the carpet has its own physical and chemical properties, and therefore different processing conditions. For example, ethylene-vinyl acetate copolymer (EVA) used in the mass coat or backing of the carpet and as an additive to the scrap material to be processed begins to degrade at 190°–200° C. releasing acetic acid in the process. Since EVA is a major component of carpet scrap, serious consideration must be given to the processing temperature. Polypropylene has a melt temperature of 165° C. while nylon 6,6 has a melt temperature of 265° C. To prepare blends of EVA and polypropylene materials, one would ideally operate between about 210° C. and 230° C.; however, EVA degradation may prevent operation at such high temperature.

It was determined experimentally that the preferred melt compounding temperature of the scrap should be about 230° C. which produces a more uniform product. Further, a lower injection molding or extrusion temperature of about 204° C. to produce the product in pelletized form was used to prevent further thermal degradation of the material.

As noted above, in accordance with the method of the present invention, all formulations were compounded at a temperature of 230° C., and injection molded at 204° C. to produce test specimens or finished product for testing except the molding temperature was higher for those formulations in which polypropylene was used as an additive. All melt compounding of the formulations was done in either a single screw or twin screw extruder. The twin screw extruder is preferred because it offers several advantages over the single screw extruder. The better feeding and more positive conveying characteristics of the twin screw extruder allows the machine to process hard-to-feed materials (such as carpet scrap). The controllable residence times, a narrow residence distribution (RTD) spectrum, as well as better mixing are other advantages of the double screw extruder.

An analysis of each of the various samples of carpet scrap was conducted to determine what the constituents will be of the product of the present invention formed from the carpet scrap melt blend.

In general, automotive carpet scrap compositions presently available comprise various amounts of nylon 6, or nylon 6,6, polypropylene, polyethylene, polyester, EVA, and filled EVA. Table 1 shows a typical detailed formulation of one carpet sample used in this study that does not contain polyethylene homopolymer.

TABLE 1

Typical Automotive Scrap Carpet Composition (MSL-1)

| Component | Purpose |
|---|---|
| 14% Nylon 6/6 | Carpet Face |
| 4% Polypropylene | Primary Backing |
| 11% EVA | Pre-coat |
| 71% BaSO$_4$ Filled EVA | Backcoat |

More specifically, the backcoating set forth above contains the following constituents.

| 75% BaSO$_4$ | Filler |
|---|---|
| 14–29% EVA | Polymer Matrix |
| 4–10% Naphthenic Oils | Processing Oils |
| Trace of Organic Acids | Elongation Additive |

The EVA disclosed above comprises copolymers of ethylene and vinyl acetate, having varying vinyl acetate content, and thus varying potential to form hydrogen bonding. A suitable EVA is sold under the E.I. Dupont de Nemours, E.I. & Co. trademark, "Elvax." EVA is inherently flexible, resilient, tough and shows high gloss, good scuff resistance, and excellent resistance to ozone and environmental stress cracking.

EVA copolymer, because of more polarity and hydrogen bonding, provides outstanding toughness and flexibility over a broad temperature range and gives more uniform blending with the thermoplastic components in the carpet scraps. EVA copolymers offer a unique combination of processing and performance characteristics.

It appears that EVA is a good additive for carpet reclamation in addition to the EVA already present in the blend. The additional EVA improves the mechanical and thermal properties, especially impact strength, elongation, and flow characteristics of the blend and finished products formed from the blend. For the reasons cited hereinabove, various levels of EVA are added to the carpet scrap blend.

Compatibilizing agents serve to reduce phase size and/or surface tension between incompatible polymers. These phase size differences and surface tensions are usually responsible for poor mechanical properties of polymer blends. Processed carpet scrap blends consist of various plastics materials, some of which are incompatible with each other. Hence, compatibilizing agents were used to modify the properties of carpet scrap blends.

A compound which is added to the carpet scrap blend as a useful compatibilizing agent is an acrylic acid modified polypropylene polymer sold under the trademark Polybond™ 1001.

Other compounds found in scrap are anhydride modified polymers sold under the trademark Bynel CXA 302 and CXA E361. They are available in pellet form for use in conventional extrusion equipment.

TABLE 2

Typical Property Data of Bynel ™ Resins

| Property | CXA E 361 Mod. EVA | CXA 302 Mod. PP |
|---|---|---|
| Melt Index (dg/min) | 2.0 | 3.6 |
| Density (g/cm$^3$) | 0.95 | 0.91 |
| Melt Point (°C.) | 80 | 152 |
| Freeze Point (°C.) | 58 | 105 |
| Vicat Softening Point (°C.) | 56 | 125 |

A further compound found in carpet scrap is a thermoplastic rubber comprising a maleic anhydride functionalized copolymer consisting of polystyrene endblocks and poly-(ethylene/butylene) midblocks known as "Kraton FG 1901X" a trademark of Shell Chemical Co. The functionality in this material enhances the interaction of the polymer with polar materials, offering some unique advantages in a variety of applications. It also affords excellent thermal, oxidative and UV stability.

TABLE 3

Typical Properties of Kraton ™ FG 1901X

| Property | Value |
|---|---|
| Density (g/cm$^3$) | 0.91 |
| Polymeric Styrene Content (% w) | 28 |
| Hardness, Shore A | 75 |
| Tensile Strength (psi) | 5,000 |
| Elongation at Break (%) | 500 |

Another compatibilizing agent found in carpet scrap and used in accordance with the present invention is "Surlyn." "Surlyn" a trademark of the E. I. DuPont de Nemours & Co. is a matrix of hydrocarbons in which are embedded relatively short polyethylene chains and granules of polymethacrylate linked with sodium ions.

The compatibilizing agents set forth above including Elvax™, Polybond™, Bynel™, and Kraton™ improved the impact strength of the carpet scrap and improved the compatibility among the polymers.

One or more of these compatibilizers are added in amounts of between about 1% and 30% by weight, alone or in combination with EVA. The total amount of compatibilizer and EVA resin added to the scrap will generally not exceed 30% by weight.

In one set of samples, polypropylene was used as an additive. The polypropylene was used as a resin to increase the rigidity of the more flexible carpet blends to produce a "rigid" polyblend.

EXAMPLE 1

This series of experimental studies was conducted in order to evaluate the effectiveness of the various EVA and compatibilizing agents detailed above that were added to the MSL-1 carpet scrap detailed in Table 1. A total of thirty-eight formulations as set forth in Tables 5, 6 and 7 were prepared for the purpose of this Example 1 representing different loadings of EVA and compatibilizing agents. In this experiment, four EVAs, with different vinyl acetate contents and varying melt index values, were added to the carpet scrap in 10%, 20%, and 30% proportions, respectively, in order to determine the effects of these additives on the properties of recycled carpet scrap. The carpet scrap comprised various combinations of constituents including nylon, polypropylene, polyester and the other constituents set forth in compositions A–H above.

The effects of aforementioned compatibilizing agents on both mechanical and thermal properties of recycled scrap was also examined.

These compatibilizing agents were added, singly or in combination with EVA or PP, into the carpet scrap.

The properties of the unmodified MSL-1 carpet scrap as shown in Table 17, no. 20 were:

Tensile Strength @ peak: 688 psi
Modulus of Elasticity: 9,000 psi
Elongation at Break Value: 7.6%
Hardness (A-2): 79
Impact Strength (notched): 3.1 ft lb/in
(Unnotched): 4.8 ft lb/in The optimum drying temperature of 90° C., drying time of two hours and processing temperatures between 180° C. to 230° C.

Processing temperatures were determined using a torque rheometer. Samples were processed at various temperatures, pressed into flat specimens, and inspected both visually and by feel. The highest temperature at which the carpet face fibers appeared to remain fully intact was 180° C. The lowest temperature at which fibers appeared to completely melt and disperse was 230° C. However, it is expected that most of the $H_2O$ would be removed at this temperature, limiting the amount of degradation.

Samples from the carpet scrap melt were compounded and pelletized, at temperatures of both 180° C. and 230° C., using a twin screw extruder. Pellets were injection molded at 204° C., or in the case of polypropylene containing samples, at 230° C., into standard ASTM test specimens. Tensile and impact properties were determined as well as Shore hardness and deflection temperature under load. ASTM protocols were followed for all tests as set forth in Example 1. The degradation characteristics of the compounded formulation were determined using Thermogravimetric Analysis (TGA) techniques.

In general-the material processed at the low temperature (180° C.) exhibited higher values of modulus, tensile strength, hardness, and deflection temperature under load than their high temperature (230° C.) counterparts. However, ultimate elongation values for the low temperature processed material were lower. These lower ultimate elongation values are possibly explained by the presence of intact fibers which had not disappeared through melting, thus inhibiting more elastomeric behavior.

The onset of degradation was found to occur in the 180° C. to 200° C. range coinciding with the deacetylation temperature of EVA. Nevertheless, the degree of degradation at 230° C. did not appear to be significant, perhaps due to relatively low residence time during the compounding operation.

It is preferable to dry the blends at temperatures substantially in excess of 90° C., since polyester and nylon are hygroscopic materials, however, the EVA softens and becomes tacky at temperatures in excess of 90° C. Nylons and polyesters tend to degrade during processing if water is present, however, it is expected that most of the water would be removed at this temperature limiting the amount of degradation.

After drying, the carpet scrap, EVA and compatibilizing additives were weighed and premixed in a closed container for five minutes to ensure a better mixing and distribution of additives. This blend was then melt blended inside the intermeshing, co-rotating, twin screw extruder. The extruder was operated at 120 rpm and equipped with a medium shear screw profile and a rod die for pelletization. The extrudates were then cooled in a water bath and pelletized. The operation temperature was set at 230° C. The actual melt temperature was about 237° C. The head pressure for all formulations was in the range of 350 to 470 psi.

The mixed blends of automotive carpet exhibited poor adhesion at the polymer-polymer interface and thus, poor properties in general. The compatibilizing agents noted above compatibilized different polymers contained in the carpet, which included PP, nylon 6,6, and EVA.

In instances where-polypropylene was used as the predominate (matrix) polymer, it had the following mechanical properties as set forth in Table 4.

TABLE 4

| Mechanical Properties of Pure PP | |
| --- | --- |
| Tensile Yield strength (psi) | 5,200 |
| Tensile Modulus (psi) | 210,000 |
| Elongation at Break (%) | 400 |
| Melt Index (g/10 min.) | 0.45 |
| Manufacturer | Amoco |

A 20 ton, 22.8 cc. Ingersoll-Rand Toggle Type injection molding machine was used to mold the tensile and impact bars for each of the formulations. The injection molding machine was operated at 204° C. for all formulations, except for those with PP added, in which case, the operating temperature of the injection molding machine was 230° C. The following Tables 5, 6, and 7 set forth the specific formulations used in this Example 1 to form the shaped articles that fall within the scope of the present invention.

TABLE 5

| Recycle Formulations of MSL-1 Carpet Scrap | |
| --- | --- |
| Formulation Number | Formulation Description |
| No. 43 | MSL-1 Scrap + 10% Elvax 170 |
| No. 44 | MSL-1 Scrap + 20% Elvax 170 |
| No. 45 | MSL-1 Scrap + 30% Elvax 170 |
| No. 49 | MSL-1 Scrap + 10% Elvax 360 |
| No. 50 | MSL-1 Scrap + 20% Elvax 360 |
| No. 51 | MSL-1 Scrap + 30% Elvax 360 |
| No. 55 | MSL-1 Scrap + 10% Elvax 350 |
| No. 56 | MSL-1 Scrap + 20% Elvax 350 |
| No. 57 | MSL-1 Scrap + 30% Elvax 350 |
| No. 61 | MSL-1 Scrap + 10% Elvax 760 |
| No. 62 | MSL-1 Scrap + 20% Elvax 760 |
| No. 63 | MSL-1 Scrap + 30% Elvax 760 |

TABLE 6

| Recycle Formulations of MSL-1 Carpet Scrap | |
| --- | --- |
| Formulation Number | Formulation Description |
| No. 64 | MSL-1 Scrap + 2% PB 1001 |
| No. 65 | MSL-1 Scrap + 10% PB 1001 |
| No. 66 | MSL-1 Scrap + 1% PB Surlyn |
| No. 67 | MSL-1 Scrap + 10% Surlyn |
| No. 68 | MSL-1 Scrap + 5% E361 |
| No. 69 | MSL-1 Scrap + 10% E361 |
| No. 70 | MSL-1 Scrap + 5% E302 |
| No. 71 | MSL-1 Scrap + 10% E302 |
| No. 72 | MSL-1 Scrap + 29% Elvax 170 + 1% PB1001 |
| No. 73 | MSL-1 Scrap + 20% Elvax 170 + 10% PB 1001 |
| No. 74 | MSL-1 Scrap + 29% Elvax 360 + 1% PB 1001 |

TABLE 6-continued

Recycle Formulations of MSL-1 Carpet Scrap

| Formulation Number | Formulation Description |
| --- | --- |
| No. 75 | MSL-1 Scrap + 20% Elvax 360 + 10% PB 1001 |
| No. 76 | MSL-1 Scrap + 29% Elvax 760 + 1% PB 1001 |
| No. 77 | MSL-1 Scrap + 20% Elvax 760 + 10% PB 1001 |

TABLE 7

Recycle Formulations of MSL-1 Carpet Scrap

| Formulation Number | Formulation Description |
| --- | --- |
| No. 78 | MSL-1 Scrap + 27.5% Elvax 170 + 2.5% E361 |
| No. 79 | MSL-1 Scrap + 20% Elvax 170 + 2.5% E361 |
| No. 80 | MSL-1 Scrap + 27.5% Elvax 360 + 2.5% E361 |
| No. 81 | MSL-1 Scrap + 20% Elvax 360 + 10% E361 |
| No. 82 | MSL-1 Scrap + 27.5% Elvax 760 + 2.5% E361 |
| No. 83 | MSL-1 scrap + 20% Elvax 760 + 10% E361 |
| No. 84 | PP + 49% MSL-1 Scrap + 1% PB 1001 |
| No. 85 | PP + 40% MSL-1 Scrap + 10% PB 1001 |
| No. 86 | PP + 47.5% MSL-1 Scrap + 2.5% E 302 |
| No. 87 | PP + 40% MSL-1 Scrap + 10% E 302 |
| No. 88 | PP + 45% MSL-1 Scrap + 5% Kraton |
| No. 89 | PP + 40% MSL-1 Scrap + 10% Kraton |

The formulations comprising the constituents found in each sample of scrap in intimate admixture with the additives were dried for two hours prior to injection molding to form samples.

After samples were obtained the following tests were performed to measure the properties of the recycled material.

An Instron Universal Testing Machine, model 6025, was used to test the tensile properties of each formulation. The ASTM D-638 Standard test method was employed. The test was performed at a constant crosshead speed of 2 inches/minute. All the samples were conditioned by the ASTM prescribed method prior to testing. The test specimens were stored in a 73° F. and 50% relative humidity room for 24 hours. Six samples were tested for each formulation to ensure a normal distribution of the tensile strength.

The Izod impact strength of the samples was conducted according to the ASTM D256 test procedure.

The hardness value of each sample was evaluated by using Shore A-2 type (for soft material) or D type (for hard material) hardness tester according to ASTM D—2240 test procedure.

Melt flow rates (MFR) of each formulation were measured by using Model AD987 (Tinius Olsen Co., Willow Grove, Pa.) extrusion plastometer according to ASTM D—1238 test procedure. The test sample material was oven-dried at a temperature of 90° C. for two hours before testing. The MFRs were determined (g/10 min) at 204° C. for formulations from No. 1 to No. 34 or at 230° C. for formulations from No. 35 to No. 39. The total load on the melt for all formulations was 2160 grams.

TABLE 8

MSL-1 Carpet Scrap & EVA

| Test No. | Tensile Strength at Break (PSI) (ASTM D638) | Elongation % (ASTM D638) | Hardness (Shore A) |
| --- | --- | --- | --- |
| No. 43 | 675 | 32 | 84 |
| No. 44 | 574 | 42 | 76 |
| No. 45 | 473 | 80 | 73 |
| No. 49 | 625 | 28 | 90 |
| No. 50 | 591 | 55 | 86 |
| No. 51 | 523 | 148 | 87 |
| No. 55 | 618 | 24 | 90 |
| No. 56 | 544 | 28 | 89 |
| No. 57 | 502 | 38 | 90 |
| No. 61 | 658 | 20 | 92 |
| No. 62 | 638 | 25 | 89 |
| No. 63 | 633 | 41 | 87 |

Table 8 sets forth the results indicated. All four EVA grades lowered rigidity in terms of tensile modulus of elasticity.

All four EVA grades significantly increased the ultimate elongation of injection-molded parts, especially, the Elvax™ 170 and Elvax™ 360 EVA resins.

When the amount of Elvax™ 170 EVA resin added was raised from 0% to 30%, elongation increased from 7.6% to 80%. When varying amounts of Elvax™ 360 was used, the increase was from 7.6% to 148%. In the case of producing injection molded parts, with EVA additives present in the blend, the parts were flexible and ductile, rather than brittle. The injection-molded parts showed great impact resistance. When the Izod impact strength test was conducted, no break occurred for all these formulations with EVA added.

Mats and sheets made by using formulation No. 45 (Table 18), i.e., 30% Elvax™ 360, compounded at 230° C., showed one of the potential applications for recycled carpet material. The melt flow rates of all formulations (No. 40 to No. 63, Table 18) with EVA as additives were in the range of general-purpose commodity thermoplastics.

In summary, the various levels of EVA lowered flexural rigidity and strength somewhat, and improved impact strength and ductility significantly. These mixed materials were easily processed both for extrusion and injection molding, though some minor modifications of the twin screw extruder were needed to feed ground carpet into the extruder.

The test results showed that incorporation of the compatibilizing agents, even at small percentages, increased the tensile strength and elongation at break significantly. Impact strengths of these sample nos. 64–71, on Table 9 (64 through 71 on Table 19) were also greatly improved. The results set forth in Tables 10, 11 and 12 indicate some increase in the compatibility of the mixed materials.

TABLE 9

Properties of Recycled MSL-1 Carpet
(MSL-1 Recycled Carpet Scrap + Compatibilizing Agent)

| Test No. | Formulation Description | Molding Temp (°C.) | Notched Izod (ft. lb/in) | Unnotched Izod (ft. lb/in.) | Melt Index (g/10 min) |
| --- | --- | --- | --- | --- | --- |
| No. 64 | MSL-1 + 2% PB | 204 | 5.92 | 8.87 | 1.7 |
| No. 65 | MSL-1 + 10% PB | 204 | 3.97 | 7.28 | 3.3 |

TABLE 9-continued

Properties of Recycled MSL-1 Carpet
(MSL-1 Recycled Carpet Scrap + Compatibilizing Agent)

| Test No. | Formulation Description | Molding Temp (°C.) | Notched Izod (ft. lb/in) | Unnotched Izod (ft. lb/in.) | Melt Index (g/10 min) |
|---|---|---|---|---|---|
| No. 66 | MSL-1 + 1% Surlyn | 204 | 5.04 | 8.00 | 2.0 |
| No. 67 | MSL-1 + 10% Surlyn | 204 | 4.00 | 6.80 | .5 |
| No. 68 | MSL-1 + 5% E361 | 204 | 6.00 | No break | 2.8 |
| No. 69 | MSL-1 + 10% E361 | 204 | No Break | No Break | 2.6 |
| No. 70 | MSL-1 + 5% E302 | 204 | 6.64 | 11.2 | 2.1 |
| No. 71 | MSL-1 + 10% E302 | 204 | 4.96 | 9.05 | 2.5 |

Table 10 shows additional improved mechanical properties not disclosed in Table 9.

TABLE 10

Mechanical Properties of MSL-1 Recycled Carpet Scrap
(MSL-1 Carpet Scrap + Compatibilizing Agent)

| Test No. | Tensile Strength at Peak (psi) | Elongation at Break (%) | Hardness Shore (D) |
|---|---|---|---|
| No. 64 | 1,322 | 17 | 50 |
| No. 65 | 1,717 | 10 | 57 |
| No. 66 | 1,278 | 10 | 50 |
| No. 67 | 1,386 | 8 | 52 |
| No. 68 | 1,387 | 24 | 50 |
| No. 69 | 1,428 | 34 | 47 |
| No. 70 | 1,340 | 20 | 52 |
| No. 71 | 1,450 | 17 | 56 |

Polybond™ 1001, even at 2% by weight, increased the tensile strength from 688 psi to 1322 psi, elongation also from 7.6% to 17.5%, and Izod impact strength (unnotched) from 4.8 to 8.9 ft lb/in.

The Surlyn™ ionomer increased flexibility, impact strength and tensile strength as the results showed.

The Bynel™ CXA E361, (the anhydride modified EVA polymer) and Bynel™ CXA E302, (the anhydride modified PP polymer) added to the MSL-1 carpet scrap improved interfacial adhesion, and mechanical properties.

Both of the Bynel™ compatibilizers were effective in raising impact strength, and elongation values. The injection-molded parts, having these two additives incorporated therein even at 5% by weight, were flexible, rubbery, and still had relatively good tensile strength (in the range of 1340–1400 psi).

Anhydride modified EVA (CXA E361) provided more flexible properties than the unmodified blend. The impact strength, elongation increased with the increase of proportion of CXA E361.

In summary, the addition of these compatibilizing agents to the carpet scrap indicated a complicated system, sensitive to not only the type of additives, but also the concentration of these additives. The overall improvement of the properties gave an indication of a possible occurrence of a reaction among amide end-group of nylon 6,6, polypropylene and compatibilizing agents to form an interchain copolymer.

EVA when used as an additive showed considerable promise for improving the properties of carpet scrap. A number of second additives, i.e., compatibilizing agents, were explored for improving tensile strength, rigidity, toughness ductility, and impact resistance.

In comparison with the formulations set forth in Table 8 hereinabove (MSL-1 carpet scrap+EVA), the addition of second additives increased toughness and tensile strength. The impact strength and elongation were still high enough and the overall improvement in properties was significant. Table 11 shows the mechanical properties of these formulations.

TABLE 11

Mechanical Properties of MSL-1 Recycled Carpet Scrap
(MSL-1 Carpet Scrap + Elvax + Compatibilizing Agents)

| Test No. | Tensile Strength at peak (psi) | Elongation at Break (%) | Elongation at Break (%) |
|---|---|---|---|
| No. 72 | 965 | 40.3 | 70.2 |
| No. 73 | 1,206 | 30.6 | 56.7 |
| No. 74 | 1,008 | 30.1 | 49.2 |
| No. 75 | 1,322 | 23.0 | 31.8 |
| No. 76 | 1,313 | 23.8 | 30.0 |
| No. 77 | 1,641 | 18.4 | 22.9 |
| No. 78 | 749 | 52.5 | 81.3 |
| No. 79 | 1,046 | 66.5 | 78.0 |
| No. 80 | 928 | 47.1 | 58.3 |
| No. 81 | 1,114 | 64.4 | 78.0 |
| No. 82 | 1,135 | 34.0 | 40.1 |
| No. 83 | 1,310 | 47.2 | 49.0 |

As for the effect of EVAs, it is found from the results that with the increase of vinyl acetate content, the modulus and tensile strength decreased somewhat and impact strength as well as elongation increased. As noted, low modulus is equivalent to flexibility.

Among the formulations disclosed in Table 20, formulations No. 79, No. 81, No. 83, that is, 70% MSL-1 carpet scrap+20% Elvax 170+10% E361; 70% MSL-1 carpet scrap+20% Elvax 360+10% E361; and 70% MSL-1 carpet scrap+20% Elvax 760+10% E361, respectively, provided balanced properties to the final products, i.e., very good impact resistance, high elongation value, and relatively good toughness and tensile strength.

Table 12 discloses additional properties that were not set forth in Table 11.

TABLE 12

Properties of MSL-1 Recyled Carpet Scrap
(MSL-1 Carpet Scrap + Elvax + Compatibilizing Agents)

| Test No. | Formulation description | Izod Impact (ft. lb/in) Notched | Izod Impact (ft. lb/in) Unnotched | Hardness Shore (D) | Melt Flow Rate and Temp. (g/10 min)/°C.) |
|---|---|---|---|---|---|
| No. 72 | MSL-1 scrap + 29% Elvax 170 + 1% PB 1001 | nb | nb | 38 | 1.5 |
| No. 73 | MSL-1 Scrap + 29% Elvax 170 + 10% PB 1001 | 6.1 | nb | 43 | 2.9 |
| No. 74 | MSL-1 Scrap + 29% Elvax 360 + 1% PB 1001 | nb | nb | 45 | 2.5 |
| No. 75 | MSL-1 Scrap + 20% Elvax 360 + 10% PB 1001 | 5.9 | nb | 49 | 3.9 |

TABLE 12-continued

Properties of MSL-1 Recyled Carpet Scrap
(MSL-1 Carpet Scrap + Elvax + Compatibilizing Agents)

| Test No. | Formulation description | Izod Impact (ft. lb/in) Notched | Izod Impact (ft. lb/in) Unnotched | Hardness Shore (D) | Melt Flow Rate and Temp. (g/10 min)/°C.) |
|---|---|---|---|---|---|
| No. 76 | MSL-1 Scrap + 29% Elvax 760 + 1% PB 1001 | 5.6 | nb | 46 | 3.0 |
| No. 77 | MSL-1 Scrap + 20% Elvax 760 + 10% PB 1001 | 4.4 | nb | 54 | 4.0 |
| No. 78 | MSL-1 Scrap + 27.5% Elvax 170 + 2.5% E361 | nb | nb | 36 | 2.0 |
| No. 79 | MSL-1 Scrap + 20% Elvax 170 + 10% E361 | nb | nb | 40 | 2.0 |
| No. 80 | MSL-1 Scrap + 27.5% Elvax 360 + 2.5% E361 | nb | nb | 41 | 2.9 |
| No. 81 | MSL-1 Scrap + 20% Elvax 360 + 10% E361 | nb | nb | 42 | 3.0 |
| No. 82 | MSL-1 Scrap + 27.5% Elvax 760 + 2.5% E361 | nb | nb | 46 | 2.8 |
| No. 83 | MSL-1 Scrap + 20% Elvax 760 + 10% E361 | nb | nb | 46 | 2.7 |

Note:
nb-no break

It is noted that the properties of the polypropylene modified compositions disclosed in Table 17, nos. 35 through 39, support the conclusion that the blending of MSL-1 carpet scrap at various levels with polypropylene at the 0–80% level of scrap addition provides a synergistic increase in stiffness and elongation values when comparing those values (i.e. stiffness and elongation for the blends) with the unmodified MSL carpet scrap (Table 17, formulation 20) and polypropylene (Table 17, formulation 34).

Another set of experiments (Table 21, formulation No. 84 to No. 89) were run to incorporate polypropylene (PP) and compatibilizing agents with carpet scrap in an effort to produce a "rigid" material from the recycled scrap carpet.

All these formulations were compounded and injection-molded at 230° C. From the results, it was clear that addition of PP and compatibilizing agents dramatically improved the mechanical properties of injection-molded parts. The modulus and tensile strength increased greatly, and the samples still retained good impact strength and elongation. The surfaces of samples were much smoother. These formulations provided balanced properties for rigid final products.

As expected, the higher the content of compatibilizers, the more tough the samples, and therefore, the higher the elongation values. The effects of compatibilizing agents are set: forth in Tables 13 and 14.

TABLE 13

Mechanical Properties of MSL-1 Recycled Carpet Scrap
(MSL-1 Carpet Scrap + PP + Compatibilizing Agents)

| Test No. | Formulation Description | Notched Izod Impact Strength (ft. lb/in) | Unnotched Izod Impact Strength (ft. lb/in) | Hardness Shore D | Melt Flow Rate (g/10 min) |
|---|---|---|---|---|---|
| No. 84 | PP + 49% MSL-1 Scrap + 1% PB1001 | 3.6 | 12.8 | 63 | 1.2 |
| No. 85 | PP + 40% MSL-1 Scrap + 10% PB 1001 | 3.7 | nb | 65 | 1.5 |
| No. 86 | PP + 47.5% MSL-1 Scrap + 2.5% E302 | 3.6 | 12.4 | 63 | 1.1 |
| No. 87 | PP + 40% MSL-1 Scrap + 10% E302 | 4.2 | nb | 64 | 1.1 |
| No. 88 | PP + 45% MSL-1 Scrap + 5% Kraton | 12.4 | nb | 60 | 1.1 |
| No. 89 | PP + 40% MSL-1 Scrap + 5% Kraton | 8.2 | nb | 60 | 1.1 |

TABLE 14

Mechanical Properties of MSL-1 Recycled Carpet Scrap
(MSL-1 Carpet + PP + Compatibilizing Agents)

| Test No. | Tensile Modulus (psi) | Elongation at Yield (%) | Elongation at Break |
|---|---|---|---|
| No. 84 | 95,500 | 15 | 356 |
| No. 85 | 145,000 | 12 | 260 |
| No. 86 | 107,000 | 15 | 352 |
| No. 87 | 118,000 | 13 | 347 |
| No. 88 | 67,800 | 22 | 397 |
| No. 89 | 75,500 | 22 | 391 |

The product formed as a result of the method described above can be formed advantageously into flexible floor mats to be used in vehicles that are presently made of vinyl material or rubber. The material can also be used to form a nibbed mat or used as an automobile carpet backing providing excellent sound deadening properties.

The product can also be formed into rigid applications such as rigid mats, door panels, trunkliners or any other application where dimensional stability and structure are needed. In rigid applications, modified polypropylene resins are used.

EXAMPLE 2

An additional series of experimental studies was conducted to expand the evaluation of the processability and properties of automotive carpet scrap using the MSL-1 carpet scrap and processing parameters described in Example 1 and a different composition referred to as MSL-2.

The MSL-2 carpet scrap formulation contained nylon 6,6 as carpet face, polyester primary backing, and Keldax 6826Q backcoat. This backcoat was EVA based heavily filled with $CaCO_3$. The results of the experimental studies with respect to MSL-2 are set forth in Table 16. The MSL-1 data, as noted previously, is set forth in Table 17.

These formulations were compounded and pelletized at 180° C. and at 230° C. The pelletized formulations that did not contain polypropylene were injection molded into test specimens at 204° C. and those that did contain polypropylene were molded at 230° C.

Table 16 shows formulations 1 through 9 were MSL-2 scrap blended with various amounts of Keldax 6826Q at both low and high processing temperatures. Table 17 shows formulations 16 through 24 consisted of MSL-1 carpet and various amounts of Keldax 8210 compounded at both temperatures.

EXAMPLE 3

The purpose of this experiment was to expand the work set forth in Example 1 relating to the use of EVA as an additive. As shown in Table 16, formulations 10 through 15 blends of Elvax 410 with MSL-2 carpet scrap as the major component were evaluated. Elvax 410 is an unfilled EVA with a high MFR used as a precoat in carpet manufacturing. Formulations 25 through 30 as shown in Table 17 were similar except that they contained MSL-1 scrap as the carpet component. Improved results were observed in the formulations containing Elvax 410.

Other EVA's used included Elvax 170 (36% VA content, 0.8 MFR), Elvax 360 (25% VA content, 2.0 MFR), Elvax 350 (25% VA content, 19 MFR), and Elvax 760 (9.3% VA content, 2.0 MFR). All were evaluated at both 180° C. and 230° C. The good results obtained were consistent with the results obtained and discussed in Example 1.

Of particular interest was the dramatic improvement in ultimate elongation values of formulations processed at 230° C. and with 30% EVA content. Examples of this improvement are shown in the following blends set forth in Table 18:

No. 45 MSL-1 scrap+30% Elvax 170 Ultimate Elongation 80%

No. 51 MSL-1 scrap+30% Elvax 360 Ultimate Elongation 149%

No. 63 MSL-1 scrap+30% Elvax 760 Ultimate Elongation 41%

When these values are compared with the 8% ultimate elongation of the MSL-1 carpet scrap by itself (Formulation 20, Table 17), it is clear that a substantial improvement is obtained. The high MFR, low viscosity EVA's (Elvax 410 and 350) did not offer equivalent advantages.

The rigidity over a wide range of temperatures (−40° C. to 100° C.), of these three formulations, was determined using Dynamic Mechanical Analysis (DMA). The low temperature behavior of these formulations was favorable.

The low temperature properties of sheets made from these formulations were compared to sheets made from other formulations. These comparison sheets were identified as 0.125 PVC and 0.125 LC-7. Formulation 51 of Table 18 was thought to be the one most closely resembling the properties of these comparison sheets, particularly at low temperatures. Pellets of formulation 51 were fabricated into a sample throw-in mat. Results were extremely positive as the sample showed excellent nib tear resistance.

EXAMPLE 4

This example discloses a series of additional experimental tests that were run to establish the extent of improvements to the blends resulting from the addition of compatibilizing agents. The blends were prepared using the procedure disclosed in Example 1.

Formulations 64 through 71 of Table 19 disclose various compatibilizing agents blended with the MSL-1 scrap. These agents were utilized in small amounts (not more than 10% by weight). The compatibilizing agents studied were the ones utilized in Example 1 and those set forth in Table 15.

TABLE 15

COMPATIBILIZING AGENTS

| TRADE NAME | COMPOSITION | MANUFACTURER |
|---|---|---|
| PB1001 | polypropylene having acrylic acid grafted thereon | BP Chemicals |
| BYNEL CXA E361 | a maleic anhydride modified poly(ethylene-co-vinyl acetate) | Du Pont |
| BYNEL CXA E302 | a maleic anhydride modified polypropylene | Du Pont |
| SURLYN | maleic anhydride modified styrene-ethylene-butene-1-styrene triblock copolymer | Du Pont |

In Table 20, formulations 78, 79 and 81 set forth the mechanical properties of a blend of MSL-1 scrap and various Elvax resins, and small amounts (no more than 10%) of compatibilizing agents.

These three samples exhibited excellent-impact resistance during Izod impact tests and all had good ultimate elongations (around 80%). All three had good behavior (limited crazing) in hand blending tests.

EXAMPLE 5

A blend of MSL-3 scrap plus additives was prepared using the process described in Example 1.

MSL-3 scrap had a nylon 6 carpet face, polyester primary backing, and Keldax 8210 as backcoat.

The MSL-3 scrap blend samples were then tested. The results of the mechanical tests are set forth in Table 22.

All MSL-3 versions exhibited excellent resistance to break during Izod impact tests.

Formulations 97 and 98 of Table 22 were extruded through a sheet die. The melt strength of these formulations was suitable for sheet production. The importance of drying was recognized again as indicated by the presence of bubbles when pellets of the material were not dried prior to extrusion. The extruded sheets had a good feel and good mechanical properties. Alternatively blends were prepared without drying using a vented extruder.

Scanning Electron Micrographs (SEM) of formulation 98 of Table 22 confirmed these were improvements in morphology compared with micrographs of the scrap by itself. The unmodified carpet scrap MSL-3 (formulation 90) clearly shows multiple phases and size whereas the modified formulation exhibits a much more uniform landscape. Formulation 98 was also roll milled into sheets.

Formulations 99 and 100 of Table 22 repeated formulations 97 and 98 but using only 10% of the Elvax component. Once again no tensile yield point was observed. Both formulations had elongation values exceeding 250%. Neither sample broke during Izod impact tests.

Formulation 101 of Table 22 was identical to 98 but was compounded in a single screw extruder. Properties were comparable to the twin screw compounded formulation.

The following Tables 16–22 disclose the results of mechanical tests that were performed on the blends listed that are discussed in Examples 1–5.

TABLE 6

MECHANICAL PROPERTIES OF MSL-2 RECYCLED CARPET SCRAP + VARIOUS ADDITIVES

| TEST NO. | FORMULATION DESCRIPTION | TENSILE YIELD STR. (LB/IN$^2$) | YIELD ELONGATION % | IZOD IMPACT (ft-lb/in) NOTCHED | IZOD IMPACT (ft-lb/in) UNNOTCHED | HARDNESS SHORE (D) |
|---|---|---|---|---|---|---|
| 1 | MSL-2 Only (LT)$^a$ | 784 | 5.7 | 3.6 | 4.6 | 83 |
| 2 | MSL-2 + 5% 6826Q* (LT) | 832 | 7.6 | 3.7 | 5.3 | 85 |
| 3 | MSL-2 + 10% 6826Q (LT) | 752 | 7.6 | 3.7 | 5.5 | 96 |
| 4 | MSL-2 + 20% 6826Q (LT) | 736 | 7.6 | 3.8 | 5.6 | 96 |
| 5 | MSL-2 Only (HT)$^b$ | 704 | 7.2 | 3.3 | 4.2 | 80 |
| 6 | MSL-2 + 5% 6826Q (HT) | 448 | 6.7 | 2.1 | 2.8 | 83 |
| 7 | MSL-2 + 10% 6826Q (HT) | 432 | 7.0 | 2.1 | 2.8 | 85 |
| 8 | MSL-2 + 20% 6826Q (HT) | 416 | 7.0 | 2.0 | 2.7 | 87 |
| 9 | MSL-2 6826Q Only (204° C.) | 380 | 240 | 3.8 | 5.8 | 80 |
| 10 | MSL-2 + 5% Elvax 410 **(LT) | 848 | 9.5 | 4.4 | 7.1 | 83 |
| 11 | MSL-2 + 10% Elvax 410 (LT) | 880 | 11.4 | 4.5 | 8.5 | 83 |
| 12 | MSL-2 + 20% Elvax 410 (LT) | 887 | 13.8 | 4.6 | 9.9 | 80 |
| 13 | MSL-2 + 5% Elvax 410 (HT) | 592 | 8.6 | 3.0 | 5.2 | 80 |
| 14 | MSL-2 + 10% Elvax 410 (HT) | 608 | 9.4 | 3.1 | 5.3 | 78 |
| 15 | MSL-2 + 20% Elvax 410 (HT) | 752 | 12.3 | 3.2 | 7.2 | 78 |

*Keldax 6826Q is a calcium carbonate filled EVA based system.
**Elvax 410 is an unfilled EVA.
$^a$LT Stands for Low Temperature compounding. (180° C.)
$^b$HT Stands for High Temperature compounding. (230° C.)
MSL\118\003\TBL16

TABLE 17

MECHANICAL PROPERTIES OF MSL-1 RECYCLED CARPET SCRAP + VARIOUS ADDITIVES

| Test No. | Formulation Description | Tensile Modulus (lb/in$^2$) | Tensile yield Str. (lb/in$^2$) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 16 | MSL-1 Only (LT)$^a$ | 7,900 | 752 | 9.5 | — | 3.7 | 4.8 | 84 | 1.2/204 |
| 17 | MSL-1 + 5% 8210* (LT) | 9,300 | 848 | 9.2 | — | 3.7 | 6.1 | 84 | 1.2/204 |
| 18 | MSL-1 + 10% 8210 (LT) | 6,900 | 784 | 11.4 | — | 3.8 | 6.5 | 85 | 2.8/204 |
| 19 | MSL-1 + 20% 8210 (LT) | 6,600 | 752 | 11.4 | — | 4.1 | 6.8 | 86 | 3.9/204 |
| 20 | MSL-1 Only (HT)$^b$ | 9,000 | 688 | 7.6 | — | 3.1 | 4.8 | 79 | 4.6/204 |
| 21 | MSL-1 + 5% 8210 (HT) | 7,750 | 736 | 9.5 | — | 3.4 | 5.1 | 81 | 3.6/204 |
| 22 | MSL-1 + 10% 8210 (HT) | 6,700 | 704 | 10.5 | — | 3.4 | 5.2 | 83 | 2.9/204 |
| 23 | MSL-1 + 20% 8210 (HT) | 5,500 | 528 | 9.5 | — | 3.4 | 5.3 | 84 | 4.4/204 |
| 24 | MSL-1 8210 Only (204° C.) | 170 | 324 | 260 | — | 3.6 | 6.8 | 79 | 1.0/204 |
| 25 | MSL-1 + 5% 410** (LT) | 5,700 | 864 | 15.2 | — | 5.1 | 8.5 | 82 | 10.0/204 |
| 26 | MSL-1 10% 410 (LT) | 5,200 | 848 | 16.2 | — | 5.2 | 10.0 | 82 | 15.6/204 |
| 27 | MSL-1 + 20% 410 (LT) | 3,500 | 736 | 21.0 | — | 5.4 | 13.5 | 80 | 20.5/204 |
| 28 | MSL-1 + 5% | 4,300 | 736 | 17.1 | — | 3.5 | 6.4 | 79 | 18.0/204 |

TABLE 17-continued

MECHANICAL PROPERTIES OF MSL-1 RECYCLED CARPET SCRAP + VARIOUS ADDITIVES

| Test No. | Formulation Description | Tensile Modulus (lb/in²) | Tensile yield Str. (lb/in²) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| | 410 (LT) | | | | | | | | |
| 29 | MSL-1 + 10% 410 (LT) | 3,500 | 732 | 21.0 | — | 3.7 | 7.9 | 77 | 32.4/204 |
| 30 | MSL-1 + 20% 410 (LT) | 3,100 | 704 | 22.9 | — | 3.7 | 8.7 | 76 | 34.2/204 |
| 31 | MSL-1 + 90% 8210 (LT) | 390 | 380 | 110 | — | 3.9 | 6.7 | 81 | 10.2/204 |
| 32 | MSL-1 + 90% 8210 (HT) | 410 | 272 | 47 | — | 3.8 | 5.8 | 79 | 11.7/204 |
| 33 | MSL-1 + 80% 8210 (LT) | 1,461 | 320 | 22 | — | 3.8 | 6.4 | 83 | 6.6/204 |
| 34 | MSL-1 + 90% 8210 (HT) | 440 | 270 | 67 | — | 3.7 | 5.7 | 80 | 10.9/204 |
| 35 | Polypropylene Only (HT) | 33,490 | 3,467 | — | 197 | nb | nb | 96 | 0.8/230 |
| 36 | MSL-1 + 80% PP (HT) | 33,970 | 2,972 | — | 451 | 3.9 | nb | 93 | 0.8/230 |
| 37 | MSL-1 + 60% PP (HT) | 36,010 | 2,450 | — | 499 | 3.6 | 14.4 | 93 | 1.3/230 |
| 38 | MSL-1 + 40% PP (HT) | 36,390 | 1,983 | — | 177 | 3.4 | 8.64 | 92 | 2.6/230 |
| 39 | MSL-1 + 20% PP (HT) | 35,420 | 1,527 | — | 31 | 2.9 | 4.4 | 92 | 5.8/230 |

*Keldax 8210 is a barium sulfate filled EVA based system.
**Elvax 410 is an unfilled EVA.
[a]LT Stands for Low Temperature compounding at 180° C.
[b]HT Stands for High Temperature compounding at 236° C.
nb Stands for no break.
MSL\118\003.tlb17

TABLE 18

MECHANICAL PROPERTIES OF MSL-1 RECYCLED CARPET SCRAP + EVA

| Test No. | Formulation Description | Tensile Modulus (lb/in²) | Tensile yield St. (lb/in²) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 40 | MSL-1 Only (LT)[a] | 6,200 | 810 | — | 33 | — | — | 85 | 2.0/204 |
| 41 | MSL-1 + 20% Elvax 170 (LT) | 4,500 | 743 | — | 37 | — | — | 82 | 2.1/204 |
| 42 | MSL-1 + 30% Elvax 170 (LT) | 3,900 | 706 | — | 46 | — | — | 76 | 1.3/204 |
| 43 | MSL-1 + 10% Elvax 170 (HT)[b] | 6,000 | 675 | — | 32 | — | — | 84 | 2.7/204 |
| 44 | MSL-1 20% Elvax 170 (HT) | 4,100 | 574 | — | 42 | — | — | 76 | 2.5/204 |
| 45 | MSL-1 + 30% Elvax 170 (HT) | 3,000 | 473 | — | 80 | — | — | 73 | 2.7/204 |
| 46 | MSL-1 + 10% Elvax 360 (LT) | 7,100 | 742 | — | 27 | — | — | 89 | 1.8/204 |
| 47 | MSL-1 + 20% Elvax 360 (LT) | 5,800 | 670 | — | 30 | — | — | 85 | 1.2/204 |
| 48 | MSL-1 + 30% Elvax 360 (LT) | 4,200 | 574 | — | 42 | — | — | 83 | 1.5/204 |
| 49 | MSL-1 + 10% Elvax 360 (HT) | 6,700 | 625 | — | 28 | — | — | 90 | 2.4/204 |
| 50 | MSL-1 20% Elvax 360 (HT) | 5,100 | 591 | — | 36 | — | — | 86 | 2.5/204 |
| 51 | MSL-1 + 30% Elvax 360 (HT) | 3,700 | 523 | — | 149 | — | — | 87 | 2.4/204 |
| 52 | MSL-1 + 10% Elvax 350 (LT) | 6,300 | 641 | — | 25 | — | — | 87 | 3.5/204 |
| 53 | MSL-1 + 20% Elvax 350 (LT) | 5,100 | 581 | — | 30 | — | — | 86 | 6.2/204 |
| 54 | MSL-1 + 30% Elvax (LT) | 3,900 | 506 | — | 35 | — | — | 86 | 6.4/204 |
| 55 | MSL-1 + 10% | 6,000 | 618 | — | 24 | — | — | 90 | 5.7/204 |

TABLE 18-continued

MECHANICAL PROPERTIES OF MSL-1 RECYCLED CARPET SCRAP + EVA

| Test No. | Formulation Description | Tensile Modulus (lb/in$^2$) | Tensile yield St. (lb/in$^2$) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 56 | MSL-1 + 20% Elvax 350 (HT) | 4,900 | 544 | — | 28 | — | — | 89 | 9.9/204 |
| 57 | MSL-1 + 30% Elvax 350 (HT)(8) | 3,900 | 502 | — | 38 | — | — | 89 | 9.9/204 |
| 58 | MSL-1 + 10% Elvax 760 (HT)(9) | 7,700 | 692 | — | 22 | — | — | 92 | 3.0/204 |
| 59 | MSL-1 + 20% Elvax 760 (HT)(10) | 7,400 | 711 | — | 26 | — | — | 89 | 3.0/204 |
| 60 | MSL-1 + 30% Elvax 760 (LT)(11) | 7,400 | 701 | — | 34 | — | — | 87 | 3.3/204 |
| 61 | MSL-1 + 10% Elvax 760 (LT)(12) | 6,000 | 618 | — | 20 | — | — | 92 | 3.0/204 |
| 62 | MSL-1 + 20% Elvax 760 (HT)(10) | 4,900 | 544 | — | 25 | — | — | 89 | 3.0/204 |
| 63 | MSL-1 + 30% Elvax 760 (HT)(11) | 3,900 | 502 | — | 41 | — | — | 87 | 3.3/204 |

[a]LT Stands for Low Temperature compounding. (180° C.)
[b]HT Stands for High Temperature compounding. (230° C.)
TBL18

TABLE 19

MECHANICAL PROPERTIES OF MSL-1 RECYCLED CARPET SCRAP + COMPATIBILIZING AGENTS

| Test No. | Formulation Description | Tensile Modulus (lb/in$^2$) | Tensile yield St. (lb/in$^2$) | Yield Elong. % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 64 | MSL-1 + 2% PB 1001* | 42,500 | 1,322 | 17.5 | 18.7 | 5.9 | 8.9 | 50 | 1.7/204 |
| 65 | MSL-1 + 10% PB 1001 | 84,900 | 1,717 | 10.2 | 11.4 | 4.0 | 7.3 | 57 | 3.3/204 |
| 66 | MSL-1 + 1% Surtyn | 42,350 | 1,278 | 9.8 | 12.3 | 5.0 | 8.0 | 50 | 2.0/204 |
| 67 | MSL-1 + 10% Surtyn | 48,010 | 1,386 | 8.3 | 9.2 | 4.0 | 6.8 | 52 | 0.5/204 |
| 68 | MSL-1 + 5% E361** | 32,370 | 1,428 | 23.5 | 25.5 | 6.0 | nb | 50 | 2.8/204 |
| 69 | MSL-1 + 10% E361 | 20,630 | 1,340 | 34.2 | 36.4 | nb | nb | 47 | 2.6/204 |
| 70 | MSL-1 + 5% E302*** | 42,920 | 1,387 | 20.0 | 21.5 | 6.6 | 11.2 | 52 | 2.1/204 |
| 71 | MSL-1 + 10% E302 | 54,900 | 1,450 | 16.5 | 18.5 | 5.0 | 9.0 | 56 | 2.5/204 |

*PB 1001 is an acrylic acid modified PP polymer (Polybond)
**E361 is an anhydride modified EVA polymer (Bynel CXA Series 3800)
***E302 is an anhydride modified PP polymer (Bynel CXA Series 5000)
nb indicates the sample didn't break.
TBL19

TABLE 20

MECHANICAL PROPERTIES OF MSL-1 RECYCLED SCRAP + ELVAX + COMPATIBILIZING AGENTS

| Test No. | Formulation Description | Tensile Modulus (lb/in$^2$) | Tensile yield St. (lb/in$^2$) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 72 | MSL-1 + 29% Elvax 170 + 1% PB 1001 | 6,414 | 965 | 40.3 | 70.2 | nb | nb | 38 | 1.5/204 |
| 73 | MSL-1 + 20% Elvax 170 + 10% PB 1001 | 24,101 | 1,206 | 30.6 | 56.7 | 6.1 | nb | 43 | 2.9/204 |

TABLE 20-continued

MECHANICAL PROPERTIES OF MSL-1 RECYCLED SCRAP + ELVAX + COMPATIBILIZING AGENTS

| Test No. | Formulation Description | Tensile Modulus (lb/in$^2$) | Tensile yield St. (lb/in$^2$) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 74 | MSL-1 + 29% Elvax 360 + 1% PB 1001 | 12,510 | 1,008 | 30.1 | 49.2 | nb | nb | 45 | 2.5/204 |
| 75 | MSL-1 + 20% Elvax 360 + 10% PB 1001 | 27,750 | 1,322 | 23.0 | 31.8 | 5.9 | nb | 49 | 3.9/204 |
| 76 | MSL-1 + 29% Elvax 760 + 1% PB 1001 | 31,780 | 1,313 | 23.8 | 30.0 | 5.6 | nb | 46 | 3.0/204 |
| 77 | MSL-1 + 20% Elvax 760 + 10% PB 1001 | 56,160 | 1,641 | 18.4 | 22.9 | 4.4 | 10.4 | 54 | 4.0/204 |
| 78 | MSL-1 + 27.5% Elvax 170 + 2.5% E361 | 3,209 | 749 | 52.5 | 81.3 | nb | nb | 36 | 2.0/204 |
| 79 | MSL-1 + 20% Elvax 170 + 10% E361 | 5,284 | 1,046 | 66.5 | 78.0 | nb | nb | 40 | 2.0/204 |
| 80 | MSL-1 + 27.5% Elvax 360 + 2.5% E361 | 7,462 | 928 | 47.1 | 58.3 | nb | nb | 41 | 2.9/204 |
| 81 | MSL-1 + 20% Elvax 360 + 10% E361 | 7,559 | 1,114 | 64.4 | 78.0 | nb | nb | 42 | 3.0/204 |
| 82 | MSL-1 27.5% Elvax 760 + 2.5% E361 | 18,320 | 1,135 | 34.0 | 40.1 | nb | nb | 46 | 2.8/204 |
| 83 | MSL-1 + 20% Elvax 760 + 10% E361 | 15,040 | 1,310 | 47.2 | 49.0 | nb | nb | 46 | 2.7/204 | nb indicates the sample didn't break.
MSL\118\003.TBL20

TABLE 21

MECHANICAL PROPERTIES OF PP + MSL-1 RECYCLED CARPET SCRAP + COMPATIBILIZING AGENTS

| Test No. | Formulation Description | Tensile Modulus (lb/in$^2$) | Tensile yield St. (lb/in$^2$) | Yield Elongation % | Break Elong. (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 84 | PP + 49% MSL-1 + 1% PB1001 | 95,510 | 2,201 | 15.0 | 356.7 | 3.6 | 12.8 | 63 | 1.2/230 |
| 85 | PP + 40% MSL-1 + 10% PB1001 | 145,000 | 2,936 | 11.9 | 260.7 | 3.6 | nb | 65 | 1.5/230 |
| 86 | PP + 47.5% MSL-1 + 2.5% E302 | 107,000 | 2,293 | 15.4 | 352.1 | 3.6 | 12.4 | 63 | 1.1/230 |
| 87 | PP + 40% MSL-1 + 10% E302 | 118,000 | 2,626 | 13.4 | 347.0 | 4.2 | nb | 64 | 1.1/230 |
| 88 | PP + 45% MSL-1 + 5% Kraton | 67,830 | 2,549 | 22.4 | 397.5 | 12.4 | nb | 60 | 1.1/230 |
| 89 | PP + 40% MSL-1 + 10% Kraton | 74,500 | 2,531 | 22.3 | 391.0 | 8.15 | nb | 60 | 1.5/230 | nb indicates the sample didn't break.

TABLE 22

MECHANICAL PROPERTIES OF MSL-3 RECYCLED CARPET SCRAP + VARIOUS ADDITIVES

| Test No. | Formulation Description | Tensile Modulus (lb/in$^2$) | Tensile Yield Str. (lb/in$^2$) | Yield Elongation % | Break Elongation (%) | Izod Impact (ft/lb in) Notched | Izod Impact (ft/lb in) Unnotched | Hardness Shore (D) | Melt Flow Rate and Temp. (g/10 min)/(°C.) |
|---|---|---|---|---|---|---|---|---|---|
| 90 | MSL-Only | 48,040 | 1,068 | 5 | 5 | 1.9 | 4.7 | 44 | 4.6 |
| 91 | MSL-Only (wet) | | | | | | | | |
| 92 | MSL- + 30% Elvax 170* | 5,897 | 746 | 153$^a$ | 203$^a$ | nb | nb | 31 | 1.7/204 |
| 93 | MSL- + 30% Elvax 360*** | 13,810 | 742 | 29 | 128 | −10 | nb | 40 | 3.3/204 |
| 94 | MSL- + 5% E361*** | 30,630 | 1,046 | 12 | 13 | −10 | nb | 44 | 2.0/204 |
| 95 | MSL- + 10% E361 | 13,130 | 900 | 46 | 61 | nb | nb | 40 | 0.5/204 |
| 96 | MSL- + 27.5% Elvax 170 + 2.5% E361 | 8,122 | 1,138NY | 258 | 258 | nb | nb | 31 | 2.0/204 |
| 97 | MSL- + 20% Elvax 170 + 10% E361 | 4,939 | 1,239NY | 345$^b$ | 345$^b$ | nb | nb | 31 | 2.6/204 |
| 98 | MSL + 20% Elvax 360 + 10% E361 | 8,686 | 1,398NY | max | max | nb | nb | 37 | 2.1/204 |
| 99 | MSL- + 10% Elvax 170 + 10% E361 | 9,830 | 879NY | 158 | 158 | nb | nb | 34 | — |
| 100 | MSL- 10% Elvax 360 + 10% E361 | 12,400 | 1,650NY | 243 | 243 | nb | nb | 38 | — |
| 101 | MSL- + 20% Elvax 360 + 10% E361 (Single Screw) | 6,770 | 1,237NY | max | max | nb | nb | 37 | — |

*Elvax 170 is a fractional melt index, high vinyl acetate content (35%) EVA polymer by Du Pont.
**Elvax 360 is a high MW, low melt index, 25% vinyl acetate content EVA polymer by Du Pont.
***E361 is an anhydride modified EVA polymer (Bynel CXA Series 3800 by Du Pont).
$^a$Denotes a large standard deviation.
$^b$Value form the only sample that broke. Others reached the maximum elongation allowed (363%).
NY Value from end of test, no yield point observed.
nb Indicates the sample didn't break.
max indicates the maximum elongation (363%) was reached without breaking.
MSL\118\003.TBL22

What we claim and desire to protect by Letters Patent is:

1. A method of recycling carpet scrap to form a substantially homogeneous thermoplastic blend comprising the steps of:
    granulating carpet scrap having polymeric face fibers and polymeric backing to obtain an incompatible heterogeneous mixture of polyamide and polyesters in combination with polyolefins comprising:
        between about 12% and 35% polyamide;
        between about 1% and 3% polyester;
        between about 1% and 3% polypropylene;
        between about 7% and 18% polyethylene;
        between about 15% and 36% poly(ethylene-co-vinyl acetate); and
        between about 34% and 60% filler;
    adding a compatibilizing agent to said heterogenous mixture for compatibilization of said polymeric fibers and said polymeric backing, said compatibilizing agent comprises a compatibilizing amount of a mixture of:
        polypropylene, and
        a modified polypropylene selected from the group consisting of polypropylene having acrylic acid grafted thereon, and a maleic anhydride modified polypropylene; and
    heating said granulated scrap in admixture with said compatibilizing agent to form a substantially homogeneous thermoplastic blend.

2. A method of recycling carpet scrap to form a substantially homogeneous thermoplastic blend comprising the steps of:
    granulating carpet scrap having polymeric face fibers and polymeric backing to obtain an incompatible heterogeneous mixture of polyamide and polyesters in combination with polyolefins comprising:
        between about 12% and 35% polyamide;
        between about 1% and 3% polyester;
        between about 1% and 3% polypropylene; and
        between about 7% and 18% polyethylene;
    adding a compatibilizing agent to said heterogenous mixture for compatibilization of said polymeric fibers and said polymeric backing, said compatibilizing agent comprises a compatibilizing amount of a mixture of:
        polypropylene, and
        a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

3. A method of recycling carpet scrap to form a substantially homogeneous thermoplastic blend comprising the steps of:

granulating carpet scrap having polymeric face fibers and polymeric backing to obtain an incompatible heterogeneous mixture of polyamide in combination with polyolefins comprising:
between about 12% and 35% polyamide;
between about 1% and 3% polypropylene;
between about 7% and 18% polyethylene;
between about 15% and 36% poly(ethylene-co-vinyl acetate); and
between about 34% and 60% filler;

adding a compatibilizing agent to said heterogenous mixture for compatibilization of said polymeric fibers and said polymeric backing, said compatibilizing agent comprises a compatibilizing amount of a mixture of:
polypropylene, and
a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

4. A method of recycling carpet scrap to form a substantially homogeneous thermoplastic blend comprising the steps of:

granulating carpet scrap having polymeric face fibers and polymeric backing to obtain an incompatible heterogeneous mixture of polyamide and polyesters in combination with polyolefins comprising:
between about 12% and 35% polyamide;
between about 1% and 3% polyester;
between about 7% and 18% polyethylene;
between about 15% and 36% poly(ethylene-co-vinyl acetate); and
between about 34% and 60% filler;

adding a compatibilizing agent to said heterogenous mixture for compatibilization of said polymeric fibers and said polymeric backing, said compatibilizing agent comprises a compatibilizing amount of a mixture of:
polypropylene, and
a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

5. A method of recycling carpet scrap to form a substantially homogeneous thermoplastic blend comprising the steps of:

granulating carpet scrap having polymeric face fibers and polymeric backing to obtain an incompatible heterogeneous mixture of polyamide and polyesters in combination with polyolefins comprising:
between about 12% and 35% polyamide;
between about 1% and 3% polyester;
between about 1% and 3% polypropylene;
between about 15% and 36% poly(ethylene-co-vinyl acetate); and
between about 34% and 60% filler;

adding a compatibilizing agent to said heterogenous mixture for compatibilization of said polymeric fibers and said polymeric backing, said compatibilizing agent comprises a compatibilizing amount of a mixture of:
polypropylene, and
a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

6. A method of recycling carpet scrap to form a substantially homogeneous thermoplastic blend comprising the steps of:

granulating carpet scrap having polymeric face fibers and polymeric backing to obtain an incompatible heterogeneous mixture of polyamide and polyesters in combination with polyolefins comprising:
between about 35% and 55% polyamide;
between about 10% and 15% polyester; and
between about 40% and 45% polyethylene;

adding a compatibilizing agent to said heterogenous mixture for compatibilization of said polymeric fibers and said polymeric backing, said compatibilizing agent comprises a compatibilizing amount of a mixture of:
polypropylene, and
a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

7. A method of recycling carpet scrap to form a substantially homogeneous thermoplastic blend comprising the steps of:

granulating carpet scrap having polymeric face fibers and polymeric backing to obtain an incompatible heterogeneous mixture of polyesters in combination with polyolefins comprising:
between about 33% and 60% polyester; and
between about 40% and 67% polyethylene;

adding a compatibilizing agent to said heterogenous mixture for compatibilization of said polymeric fibers and said polymeric backing, said compatibilizing agent comprises a compatibilizing amount of a mixture of:
polypropylene, and
a modified polypropylene selected from the group consisting of polypropylene having acrylic acid grafted thereon, and a maleic anhydride modified polypropylene; and heating said granulated scrap in admixture with said compatibilizing agent to form a substantially homogeneous thermoplastic blend.

8. A method of recycling carpet scrap to form a substantially homogeneous thermoplastic blend comprising the steps of:

granulating carpet scrap having polymeric face fibers and polymeric backing to obtain an incompatible heterogeneous mixture of polyesters in combination with polyolefins comprising:
  between about 15% and 44% polyester;
  between about 33% and 51% polypropylene; and
  between about 24% and 34% fiber;
adding a compatibilizing agent to said heterogenous mixture for compatibilization of said polymeric fibers and said polymeric backing, said compatibilizing agent comprises a compatibilizing amount of a mixture of:
  polypropylene, and
  a modified polypropylene selected from the group consisting of polypropylene having acrylic acid grafted thereon, and a maleic anhydride modified polypropylene; and
heating said granulated scrap in admixture with said compatibilizing agent to form a substantially homogeneous thermoplastic blend.

* * * * *